(12) United States Patent
Datta et al.

(10) Patent No.: US 7,812,480 B2
(45) Date of Patent: Oct. 12, 2010

(54) APPARATUS AND METHOD FOR ON-LINE POWER SOURCE REPLACEMENT IN WIRELESS TRANSMITTERS AND OTHER DEVICES

(75) Inventors: Indradyumna Datta, Kolkata (IN); Ramesh Subbaiah, Tamilnadu (IN); RamKumar K. Ramamoorthy, Tamilnadu (IN); Y. Jaganmohan Reddy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 11 days.

(21) Appl. No.: 12/051,256

(22) Filed: Mar. 19, 2008

(65) Prior Publication Data

US 2009/0236912 A1 Sep. 24, 2009

(51) Int. Cl.
*H02J 7/00* (2006.01)
(52) U.S. Cl. .............................. 307/66; 307/65; 307/46; 307/150
(58) Field of Classification Search .................. 307/46, 307/64–66, 23, 150
See application file for complete search history.

(56) References Cited

U.S. PATENT DOCUMENTS

| | | | |
|---|---|---|---|
| 5,148,042 A * | 9/1992 | Nakazoe | 307/60 |
| 5,347,163 A * | 9/1994 | Yoshimura | 307/66 |
| 5,469,002 A * | 11/1995 | Garrett | 307/150 |
| 5,477,123 A * | 12/1995 | Allen et al. | 320/124 |
| 5,629,602 A * | 5/1997 | Makino | 307/66 |
| 5,644,282 A * | 7/1997 | Mehta et al. | 337/295 |
| 5,656,869 A * | 8/1997 | Gluskoter et al. | 307/64 |
| 5,801,513 A * | 9/1998 | Smith et al. | 307/66 |
| 5,825,100 A * | 10/1998 | Kim | 307/66 |
| 6,703,930 B2 * | 3/2004 | Skinner | 340/539.11 |
| 6,936,376 B2 | 8/2005 | Plumadore | |
| 2002/0149264 A1 * | 10/2002 | Baiardo et al. | 307/66 |

FOREIGN PATENT DOCUMENTS

| | | | |
|---|---|---|---|
| JP | 06138979 | * | 5/1994 |
| JP | 2001352696 | * | 12/2001 |
| JP | 2003111289 | * | 4/2003 |
| WO | WO2006126023 | * | 11/2006 |

OTHER PUBLICATIONS

Hot Swappable Battery Station, by Peter McNeil-KF4HCW. From www.k4lrg.org/Projects/HotSwapBats/BlockDiagram.html, dated earlier than Nov. 29, 2006, per web.archive.org.*

(Continued)

*Primary Examiner*—Fritz M Fleming (57) ABSTRACT

A method includes powering a device using one or more first power sources and coupling one or more second power sources to provide power to the device. The method also includes replacing at least one of the first power sources, where the one or more second power sources provide power to the device during replacement of the at least one first power source. The first power source(s) could include one or more first batteries in one or more first battery slots, and the second power source(s) could include one or more second batteries in one or more second battery slots. The second batteries could be inserted into the second battery slots prior to replacement of at least one of the first batteries. The first power source(s) could also include one or more batteries in one or more battery slots, and the second power source(s) could include a portable voltage source.

20 Claims, 3 Drawing Sheets

OTHER PUBLICATIONS

Internet Archive Wayback Machine (web.archive.org) dates for www.k4Irg.org/Projects/HotSwapBats/Block Diagram.html, printed out Feb. 24, 2009.*

Machine Translation for JP 06138979.*
Machine Translation for JP 2001352696.*
Machine Translation for JP 2003111289.*

* cited by examiner

APPARATUS AND METHOD FOR ON-LINE POWER SOURCE REPLACEMENT IN WIRELESS TRANSMITTERS AND OTHER DEVICES

TECHNICAL FIELD

This disclosure relates generally to device power supplies and more specifically to an apparatus and method for on-line power source replacement in wireless transmitters and other devices.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Process control systems routinely include wireless devices, such as wireless sensors and wireless actuators. These wireless devices typically do not have any physical connection to data and power supply cables. Instead, data is transmitted wirelessly, and internal power supplies (such as industrial-grade batteries) provide operating power to the wireless devices. A conventional wireless device generates an alarm when its batteries begin to run low. At that point, the conventional wireless device is taken out of service, old batteries are removed from the wireless device, new batteries are inserted into the wireless device, and the wireless device is placed back into service.

SUMMARY

This disclosure provides an apparatus and method for on-line power source replacement in wireless transmitters and other devices.

In a first embodiment, a method includes powering a device using one or more first power sources. The method also includes coupling one or more second power sources to provide power to the device. The method further includes replacing at least one of the first power sources, where the one or more second power sources provide power to the device during the replacement of the at least one first power source.

In particular embodiments, the one or more first power sources include one or more first batteries in one or more first battery slots. Also, the one or more second power sources include one or more second batteries in one or more second battery slots.

In other particular embodiments, coupling the one or more second power sources and replacing at least one of the first power sources include inserting one second battery into one second battery slot, replacing one first battery in one first battery slot, and then replacing another first battery in another first battery slot.

In yet other particular embodiments, coupling the one or more second power sources and replacing at least one of the first power sources include inserting one second battery into one second battery slot, replacing one first battery in one first battery slot, and then removing without replacing another first battery from another first battery slot.

In still other particular embodiments, the one or more first power sources include one or more batteries in one or more battery slots. Also, the one or more second power sources include a portable voltage source.

In other particular embodiments, coupling the one or more second power sources and replacing at least one of the first power sources include coupling the portable voltage source to provide power to the device, removing the one or more batteries from the one or more battery slots, and inserting one or more new batteries into the one or more battery slots.

In additional particular embodiments, the method further includes decoupling the one or more second power sources to stop providing power to the device after replacement of the at least one first power source.

In a second embodiment, a circuit includes one or more interfaces configured to be coupled to one or more first power sources and to provide a current from the one or more first power sources. The circuit also includes a current limiter configured to limit the current. The circuit further includes a power supply output configured to provide the current to one or more external components. In addition, the circuit is configured to interface with one or more second power sources, the one or more second power sources capable of providing the current for the one or more external components during replacement of at least one of the one or more first power sources.

In a third embodiment, an apparatus includes one or more powered components and a power supply circuit. The power supply circuit includes one or more interfaces configured to be coupled to one or more first power sources and to provide a current from the one or more first power sources. The power supply circuit also includes a current limiter configured to limit the current. The power supply circuit further includes a power supply output configured to provide the current to the one or more powered components. The power supply circuit is configured to interface with one or more second power sources, the one or more second power sources capable of providing the current for the one or more external components during replacement of at least one of the one or more first power sources.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
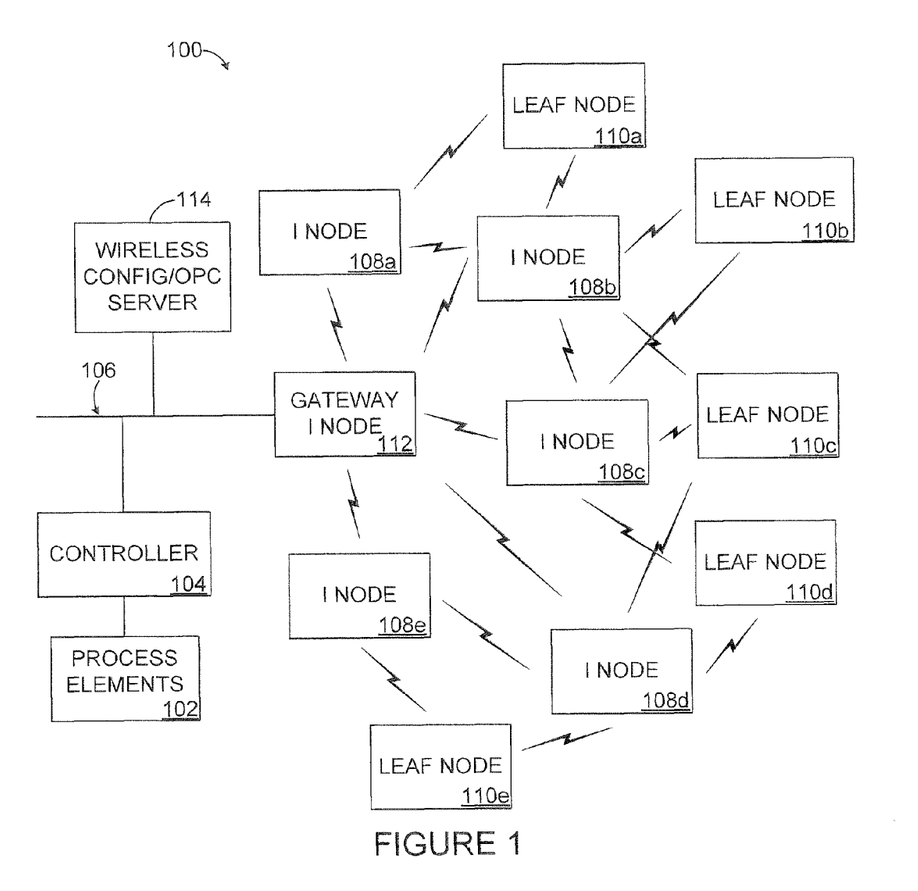
FIG. 1 illustrates an example process control system according to this disclosure.

FIG. 1 illustrates an example process control system 100 according to this disclosure. The embodiment of the process control system 100 shown in FIG. 1 is for illustration only.

Other embodiments of the process control system 100 could be used without departing from the scope of this disclosure.

In this example embodiment, the process control system 100 includes one or more process elements 102. The process elements 102 represent components in a process system that may perform any of a wide variety of functions. For example, the process elements 102 could represent sensors, actuators, or any other or additional industrial equipment in a processing environment. Each of the process elements 102 includes any suitable structure for performing one or more functions in a process system. Also, a "process system" may generally represent any system or portion thereof configured to process one or more products or other materials in some manner.

A controller 104 is coupled to the process elements 102. The controller 104 controls the operation of one or more of the process elements 102. For example, the controller 104 could receive information associated with the process system, such as by receiving sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations.

As shown in FIG. 1, the process control system 100 also includes one or more wireless networks for communicating with wireless sensors or other wireless devices. In this example, a wireless network (such as a mesh network) is formed using infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the nodes 108a-108e and 110a-110e form a wireless network capable of providing wireless coverage to a specified area, such as in a large industrial complex.

In this example, the nodes 108a-108e and 110a-110e are divided into infrastructure nodes and leaf nodes. The infrastructure nodes 108a-108e typically represent line-powered devices, meaning these nodes receive operating power from an external source. As a result, these nodes 108a-108e are typically not limited in their operations since they need not minimize power consumption to increase the operational life of their internal power supplies. On the other hand, the leaf nodes 110a-110e typically represent devices powered by local power supplies, such as nodes that receive operating power from internal batteries or other internal power supplies. Because of this, these nodes 110a-110e are often more limited in their operations in order to help preserve the operational life of their internal power supplies. These nodes 110a-110e also routinely need to have their internal batteries or other internal power supplies replaced in order to remain in operation.

Each of the nodes 108a-108e and 110a-110e includes any suitable structure facilitating wireless communications, such as a radio frequency (RF) transceiver. Each of the nodes 108a-108e and 110a-110e could also include other functionality, such as functionality for generating or using data communicated over the wireless network. For example, the leaf nodes 110a-110e could represent wireless sensors in an industrial facility, where the sensors are used to measure various characteristics within the facility. These sensors could collect sensor readings and communicate the sensor readings to the controller 104 via the gateway infrastructure node 112. The leaf nodes 110a-110e could also represent actuators that can receive control signals from the controller 104 and adjust the operation of the industrial facility. In this way, the leaf nodes 110a-110e may include or operate in a similar manner as the process elements 102 that are physically connected to the controller 104. The leaf nodes 110a-110e could further represent handheld user devices (such as INTELATRAC devices from HONEYWELL INTERNATIONAL INC.), mobile stations, programmable logic controllers (PLCs), or any other or additional devices.

In particular embodiments, the leaf nodes 110a-110e can include 802.15.4-based low data-rate sensors and 802.11-based high data-rate devices, and the various nodes in FIG. 1 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

The gateway infrastructure node 112 communicates wirelessly with, transmits data to, and receives data from one or more infrastructure nodes 108a-108e and possibly one or more leaf nodes 110a-110e. The gateway infrastructure node 112 also converts data between the protocol(s) used by the network 106 and the protocol(s) used by the nodes 108a-108e and 110a-110e. For example, the gateway infrastructure node 112 could convert Ethernet-formatted data (transported over the network 106) into a wireless protocol format (such as an IEEE 802.11a, 802.11b, 802.11g, 802.11n, 802.15.3, 802.15.4, or 802.16 protocol format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In this example, a wireless configuration and OLE for Process Control (OPC) server 114 can be used to configure and control various aspects of the process control system 100. For example, the server 114 could be used to configure the operation of the infrastructure nodes 108a-108e and the gateway node 112. The server 114 could also be used to support security in the process control system 100. For instance, the server 114 could distribute cryptographic keys or other security data to various components in the process control system 100, such as to the nodes 108a-108e, 110a-110e, and 112. The server 114 includes any hardware, software, firmware, or combination thereof for configuring wireless networks and providing security information.

In one aspect of operation, various nodes in the wireless network (such as the leaf nodes 110a-110e) operate using local or internal power supplies, such as industrial-grade batteries or other power supplies. As noted above, conventional wireless devices are typically taken out of service in order to remove the old batteries and insert new batteries into the wireless devices. At that point, the conventional wireless devices are placed back into service. However, this interrupts the regular operation of the wireless devices. In process control systems, this interruption could prevent controllers or other devices from receiving necessary or desired information during that time.

In accordance with this disclosure, wireless or other devices include or can be used with one or more mechanisms that facilitate non-interrupted or continuous supply of power to the devices. This can be done even when batteries or other power sources in the devices are being replaced. Among other things, this helps to ensure that the devices remain in operation during the replacement of batteries or other power sources. As a result, controllers or other devices (such as those in the process control system 100) can continue receiving necessary or desired information during that time.

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where on-line replacement of power sources in wireless or other devices could be used. This functionality could be used with any suitable device and in any suitable system (whether or not related to or used for process control).

Figure 2:
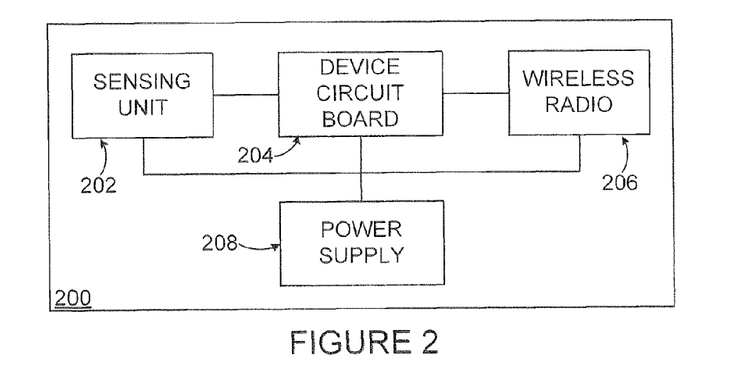
FIG. 2 illustrates an example wireless device in a process control system according to this disclosure.

FIG. 2 illustrates an example wireless device 200 in a process control system according to this disclosure. The embodiment of the wireless device 200 shown in FIG. 2 is for illustration only. Other embodiments of the wireless device 200 could be used without departing from the scope of this disclosure.

As shown in FIG. 2, the wireless device 200 includes a sensing unit 202. In this example, the wireless device 200 represents a wireless sensor that operates in the process control system 100 or other system to measure or detect one or more conditions in a process system. The sensing unit 202 could, for example, measure temperature, humidity, or vibration in the process system. The structure of the sensing unit 202 varies depending on the type of sensor functionality being implemented in the wireless device 200.

The wireless device 200 also includes a device circuit board 204 and a wireless radio 206. The device circuit board 204 interfaces with the sensing unit 202 and receives data from the sensing unit 202. For example, the device circuit board 204 could receive temperature measurements, pressure measurements, humidity measurements, or other measurements from the sensing unit 202. The device circuit board 204 then passes this information to the wireless radio 206 for transmission. The device circuit board 204 could also provide other information to the wireless radio 206 for transmission, such as status information. Depending on the implementation, the device circuit board 204 could further receive information that is received wirelessly by the wireless radio 206. The device circuit board 204 includes any suitable structure for interfacing a sensor with a wireless radio.

The wireless radio 206 facilitates wireless communications to or from the wireless device 200. The wireless radio 206 could, for example, communicate sensor and status information from the wireless device 200 to an external component (such as an infrastructure node or gateway infrastructure node). The wireless radio 206 could also receive information from an external component. The wireless radio 206 includes any suitable structure for providing wireless communications. The wireless radio 206 could, for instance, represent a transceiver coupled to an antenna. In some embodiments, the wireless radio 206 could communicate using RF signals, although any other suitable wireless signals could be used to communicate.

In particular embodiments, the wireless radio 206 is implemented using a circuit board that sits on and draws power from the device circuit board 204. The wireless radio 206 and the device circuit board 204 could, for example, be coupled together using a Serial Peripheral Interface (SPI). This interface could be used to provide both power and data to the wireless radio 206.

A power supply 208 provides operating power to various components in the wireless device 200. The power supply 208 could represent any suitable local source of operating power for the wireless device 200. For example, the power supply 208 could include one or more industrial-grade batteries. However, any other or additional source(s) of power could be used in the power supply 208.

The power source in the power supply 208 may need to be replaced from time to time. For example, extended operation of the wireless device 200 may require that batteries in the power supply 208 be changed. As described in more detail below, the power supply 208 includes or supports one or more mechanisms for ensuring that power continues to be supplied to the other components in the wireless device 200 when the batteries or other power sources are being changed in the power supply 208. This helps to ensure that the wireless device 200 remains in operation during the replacement. This could be especially useful, for example, in process systems or other systems that operate continuously.

Although FIG. 2 illustrates one example of a wireless device 200 in a process control system, various changes may be made to FIG. 2. For example, the wireless device 200 in FIG. 2 could include any other or additional components. As a particular example, the wireless device 200 could include actuator functionality to support functions of a wireless actuator (either in place of or in addition to the sensing unit 202). Also, the mechanisms described below for use with the power supply 208 could be used in any suitable wireless or other device and are not limited to use with just process control devices.

Figure 3:
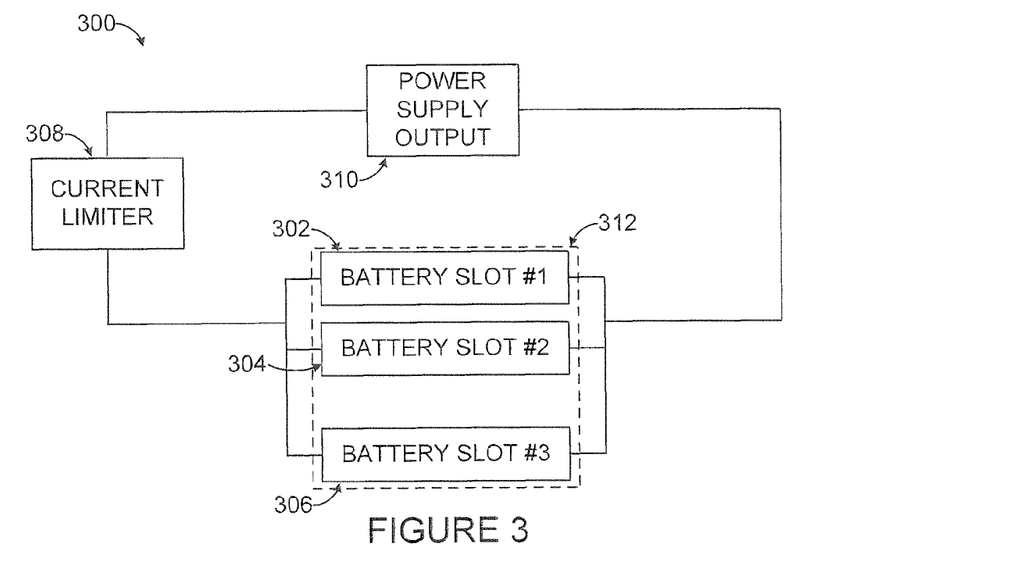
FIGS. 3 and 4 illustrate example mechanisms for on-line power source replacement in a device according to this disclosure.
Figure 4:
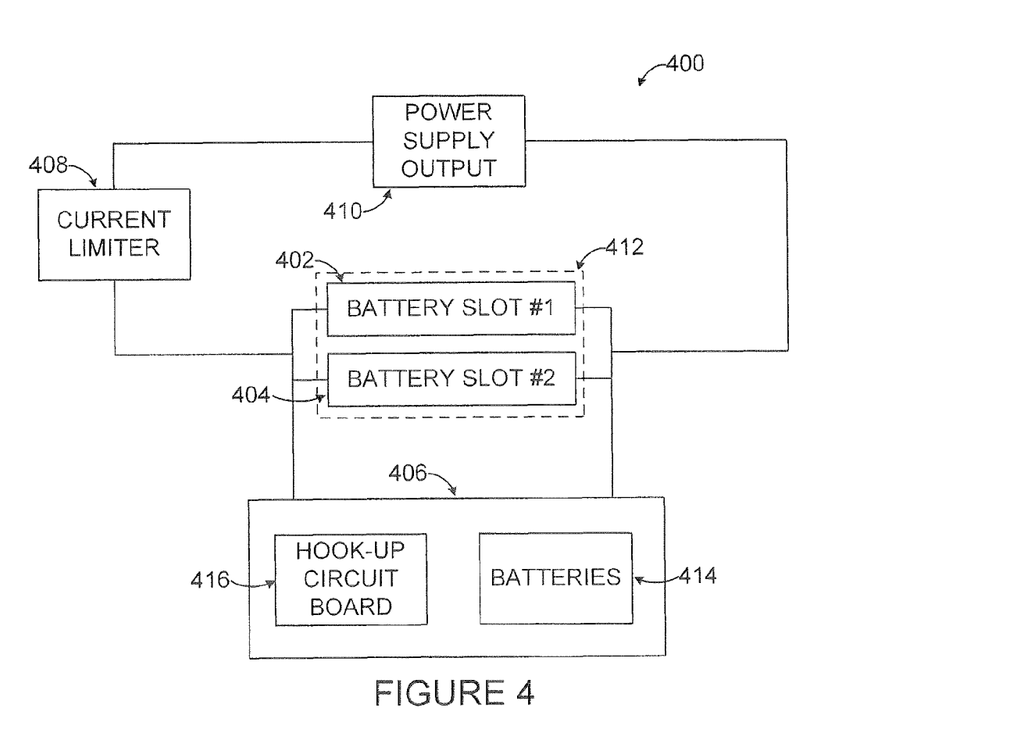

FIGS. 3 and 4 illustrate example mechanisms for on-line power source replacement in a device according to this disclosure. The embodiments of the mechanisms shown in FIGS. 3 and 4 are for illustration only. Other embodiments of these mechanisms could be used without departing from the scope of this disclosure. Also, for ease of explanation, the mechanisms are described with respect to the wireless device 200 of FIG. 2. The mechanisms could be used with any other suitable powered device.

As shown in FIG. 3, a power supply circuit 300 can be used to supply power to one or more external components. The power supply circuit 300 could, for example, be used in the power supply 208 in the wireless device 200 of FIG. 2 to provide power to other components in the wireless device

200. In this example, the power supply circuit 300 includes three battery slots 302-306, a current limiter 308, and a power supply output 310. Each of the battery slots 302-306 generally represents any suitable interface or other structure for receiving, holding, and providing electrical connection to a battery. In particular embodiments, a small printed circuit board 312 provides electrical connection between batteries in the battery slots 302-306 and the remainder of the power supply circuit 300.

The current limiter 308 generally operates to limit the amount of current supplied to the external components through the power supply output 310. Among other things, this may help to ensure that current provided by the batteries in the battery slots 302-306 is not excessive. The current limiter 308 includes any suitable structure for limiting an amount of current provided by a power supply circuit. Also, the power supply output 310 represents any suitable structure for proving power to one or more external components, such as other components of the wireless device 200.

In some embodiments, the power supply circuit 300 ordinarily provides power supplied by two batteries in the battery slots 302-304. The battery slot 306 may ordinarily remain empty. When the batteries in the battery slots 302-304 need to be replaced, the wireless device 200 (or other device being powered) could generate an alarm. The alarm could cause a light emitting diode (LED) on the powered device to illuminate. When used in the wireless device 200 in the process control system 100, the alarm could also cause the wireless radio 206 to transmit a message to a distributed control system (DCS) or other destination.

In response to the alarm (or at any other suitable time), personnel can replace the batteries in the battery slots 302-304. For example, the personnel could insert a spare battery into the battery slot 306. At this point, the battery in the battery slot 302 can be removed, and a new battery can be inserted into the battery slot 302. After that, the battery in the battery slot 304 can be removed, and a new battery can be inserted into the battery slot 304. Once both batteries in the battery slots 302-304 have been replaced, the spare battery in the battery slot 306 can be removed. Because the spare battery is present in the battery slot 306, removal of one of the batteries in the battery slots 302-304 may not interrupt operation of the device being powered by the power supply circuit 300. The powered device can continue to draw current from the power supply circuit 300 and perform its normal functions (such as process control sensing functions). During the replacement of the batteries in the battery slots 302-304, the current limiter 308 can help to ensure that current spikes or other transients caused by removal and insertion of batteries do not damage the external circuit(s) being powered. Of course, rather than replacing both batteries in the battery slots 302-304, both batteries in the battery slots 302-304 could be removed, but only one new battery could be inserted into one of the slots 302-304. That new battery, along with the battery in the battery slot 306, could then be used to power the device.

As shown in FIG. 4, a power supply circuit 400 is similar to the power supply circuit 300 of FIG. 3. The power supply circuit 400 includes two battery slots 402-404, a current limiter 408, and a power supply output 410. These components may be the same as or similar to the corresponding components in FIG. 3.

In addition, the power supply circuit 400 includes an external voltage source 406. The external voltage source 406 performs a similar function as the spare battery in the battery slot 306 in FIG. 3. For example, during a battery change, the external voltage source 406 could be connected to a circuit board 412 associated with the battery slots 402-404. As a particular example, the external voltage source 406 could be coupled to positive and negative terminals provided on the circuit board 412. The batteries in the battery slots 402-404 could then be replaced (either one at a time or at the same time). Because the external voltage source 406 is coupled into the power supply circuit 400, removal of one or more of the batteries from the battery slots 402-404 may not interrupt operation of the device being powered by the power supply circuit 400. The powered device can continue to draw current from the power supply circuit 400 and perform its normal functions. Also, the current limiter 408 can help to ensure that current spikes or other transients caused by removal and insertion of batteries do not damage the external circuit(s) being powered.

The external voltage source 406 includes any suitable structure for providing power to a powered device. In this example, the external voltage source 406 includes one or more spare batteries 414 and a hook-up circuit board 416. The hook-up circuit board 416 provides an interface between the batteries 414 and the power supply circuit 400 (such as the printed circuit board 412). The external voltage source 406 could represent a mobile or portable device that can be selectively coupled into the power supply circuit 400 of multiple devices when needed.

In particular embodiments, the power supply circuit 300 could be used in devices with adequate room for the spare battery slot 306. Some devices may not be able to accommodate the spare battery slot 306 since, for example, an industrial-grade battery could be large. In those cases, the power supply circuit 400 could be used, and the external voltage source 406 could be attached to the power supply circuit 400 when needed.

Although FIGS. 3 and 4 illustrate examples of mechanisms for on-line power source replacement in a device, various changes may be made to FIGS. 3 and 4. For example, while FIGS. 3 and 4 illustrate that two batteries are ordinarily used to supply power, any suitable number of batteries could be used during normal operation of a device (such as one battery or more than two batteries). Also, more than one spare battery slot 306 could be provided in the power supply circuit 300.

Figure 5:
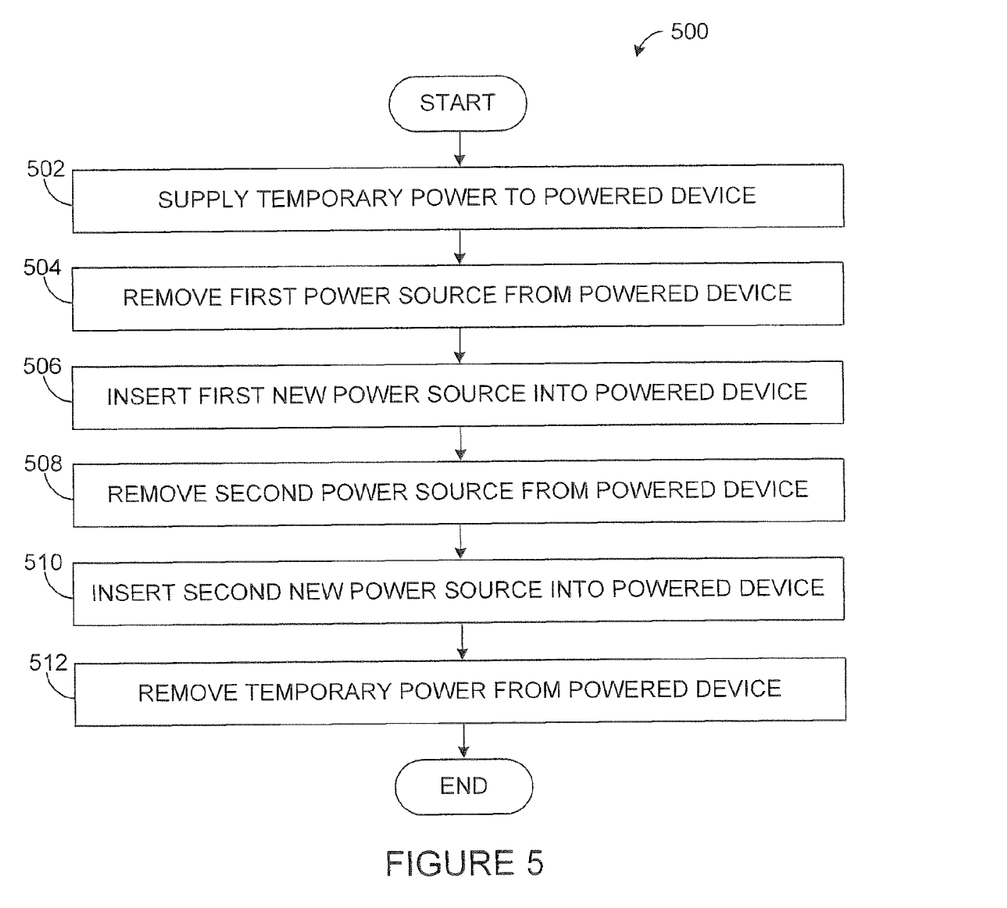
FIG. 5 illustrates an example method for on-line power source replacement in a device according to this disclosure.

FIG. 5 illustrates an example method 500 for on-line power source replacement in a device according to this disclosure. The embodiment of the method 500 shown in FIG. 5 is for illustration only. Other embodiments of the method 500 could be used without departing from the scope of this disclosure. Also, for ease of explanation, the method 500 is described with respect to the wireless device 200 using the power supply circuit 300 or 400. The method 500 could be used with any other suitable powered device that uses any suitable power supply circuit.

As shown in FIG. 5, temporary power is supplied to a powered device at step 502. This could include, for example, personnel inserting a spare battery into the spare battery slot 306 in the power supply circuit 300. This could also include the personnel attaching the external voltage source 406 to the power supply circuit 400.

A first power source is removed from the powered device at step 504, and a first new power source is inserted into the powered device at step 506. This could include, for example, the personnel removing the battery from the battery slot 302 or 402 and inserting a new battery into that battery slot. A second power source is removed from the powered device at step 508, and a second new power source is inserted into the powered device at step 510. This could include, for example, the personnel removing the battery from the battery slot 304 or 404 and inserting a new battery into that battery slot. During these steps, the voltage provided by the spare battery or the external voltage source 406 could be provided to components within the wireless device 200, enabling the wireless device 200 to continue operating normally. Also, the current limiter 308 or 408 could help to limit any transients from affecting the powered device.

The temporary power is removed from the powered device at step 512. This could include, for example, personnel removing the spare battery from the spare battery slot 306 in the power supply circuit 300. This could also include the personnel disconnecting the external voltage source 406 from the power supply circuit 400.

Although FIG. 5 illustrates one example of a method 500 for on-line power source replacement in a device, various changes may be made to FIG. 5. For example, while shown as a series of steps, various steps in FIG. 5 could overlap or occur in parallel. As a particular example, if multiple spare batteries (or a large single battery) are inserted into spare battery slots or if the external voltage source 406 includes multiple batteries (or a large single battery), both of the batteries within the wireless device 200 could be removed at the same time. Also, while shown as involving the replacement of two batteries or other power sources, the wireless device 200 could include any number of batteries or other power sources being replaced (such as one or more than two). In addition, as noted above, rather than replacing both batteries in the powered device and then removing the temporary power, a battery used to provide temporary power could remain in the device, and only one new battery could be inserted into the powered device. In this case, the "temporary" power in FIG. 5 could be more permanent.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   powering a device using multiple first batteries, the first batteries inserted into multiple first battery slots within the device, the device comprising a sensor or actuator in an industrial process control system, the first batteries comprising industrial-grade batteries;
   inserting one or more second batteries into one or more spare battery slots within the device; and
   replacing at least one of the first batteries in the first battery slots while the one or more second batteries are positioned in the one or more spare battery slots, wherein the one or more second batteries provide power to the device during the replacement of the at least one first battery;
   wherein, before the insertion of the one or more second batteries and after the replacement of the at least one first battery, each of the one or more spare battery slots is not occupied by a battery during normal operation of the device in which the sensor or actuator is powered by the batteries present in the first battery slots.

2. The method of claim 1, wherein the one or more spare battery slots are adjacent to the first battery slots.

3. The method of claim 1, wherein inserting the one or more second batteries and replacing at least one of the first batteries comprise:
   inserting one second battery into one spare battery slot;
   replacing one first battery in one first battery slot and then replacing another first battery in another first battery slot; and
   removing the second battery from the spare battery slot after replacement of the first batteries in the first battery slots.

4. The method of claim 1, wherein inserting the one or more second batteries and replacing at least one of the first batteries comprise:
   inserting one second battery into one spare battery slot; and
   replacing one first battery in one first battery slot and then removing without replacing another first battery from another first battery slot.

5. The method of claim 1, further comprising:
   limiting current from the first and second batteries during insertion of the one or more second batteries and during replacement of at least one of the first batteries.

6. The method of claim 1, wherein the device comprises a wireless sensor or wireless actuator.

7. The method of claim 1, further comprising:
   removing the one or more second batteries after replacement of the at least one first battery.

8. The method of claim 1, wherein the device comprises a wireless transmitter.

9. A power supply apparatus comprising:
   a plurality of battery slots including:
      multiple first battery slots configured to receive multiple first batteries and to provide current from the first batteries, the first batteries comprising industrial-grade batteries; and
      one or more spare battery slots configured to receive one or more second batteries and to provide current from the one or more second batteries during replacement of at least one of the first batteries;
   a current limiter configured to limit the current from the batteries; and
   a power supply output configured to provide the current to one or more external components including a sensor or actuator in an industrial process control system;
   wherein each of the one or more spare battery slots is not occupied by a battery during normal operation of the one or more external components in which the sensor or actuator is powered by the batteries present in the first battery slots.

10. The power supply apparatus of claim 9, wherein the one or more spare battery slots are adjacent to the first battery slots.

11. The power supply apparatus of claim 9, wherein the current limiter is configured to limit the current when the one or more second batteries are inserted into the one or more spare battery slots and when at least one of the first batteries is replaced in the first battery slots.

12. The power supply apparatus of claim 9, wherein the first battery slots comprise two first battery slots, and the one or more spare battery slots comprise a single spare battery slot.

13. The power supply apparatus of claim 12, wherein the two first battery slots are adjacent to each other, and the spare battery slot is adjacent to one of the first battery slots.

14. The power supply apparatus of claim 9, wherein the one or more external components comprise a wireless sensor or wireless actuator.

15. The power supply apparatus of claim 9, wherein the one or more external components comprise a wireless radio.

16. An apparatus comprising:
  one or more powered components comprising a sensor or actuator in an industrial process control system; and
  a power supply apparatus within at least one of the powered components comprising:
    a plurality of battery slots including:
      multiple first battery slots configured to receive multiple first batteries and to provide current from the first batteries, the first batteries comprising industrial-grade batteries; and
      one or more spare battery slots configured to receive one or more second batteries and to provide current from the one or more second batteries during replacement of at least one of the first batteries;
    a current limiter configured to limit the current from the batteries; and
    a power supply output configured to provide the current to the one or more powered components;
  wherein each of the one or more spare battery slots is not occupied by a battery during normal operation of the one or more powered components in which the sensor or actuator is powered by the batteries present in the first battery slots.

17. The apparatus of claim 16, wherein the one or more spare battery slots are adjacent to the first battery slots.

18. The apparatus of claim 16, wherein the current limiter is configured to limit the current when the one or more second batteries are inserted into the one or more spare battery slots and when at least one of the first batteries is replaced in the first battery slots.

19. The apparatus of claim 16, wherein the first battery slots comprise two first battery slots, and the one or more spare battery slots comprise a single spare battery slot.

20. The apparatus of claim 16, wherein the sensor or actuator comprises:
  a wireless radio configured to transmit information associated with the sensor or receive information associated with the actuator.

* * * * *